Jan. 20, 1948. R. J. WELSH 2,434,778
POWER PLANT
Filed July 24, 1944 8 Sheets-Sheet 1

Inventor: Robert J. Welsh
by Richard E. Babcock
Attorney

Jan. 20, 1948.                    R. J. WELSH                         2,434,778
                                  POWER PLANT
                              Filed July 24, 1944              8 Sheets-Sheet 4

Inventor: Robert J. Welsh
by Richard E. Babcock
                Attorney

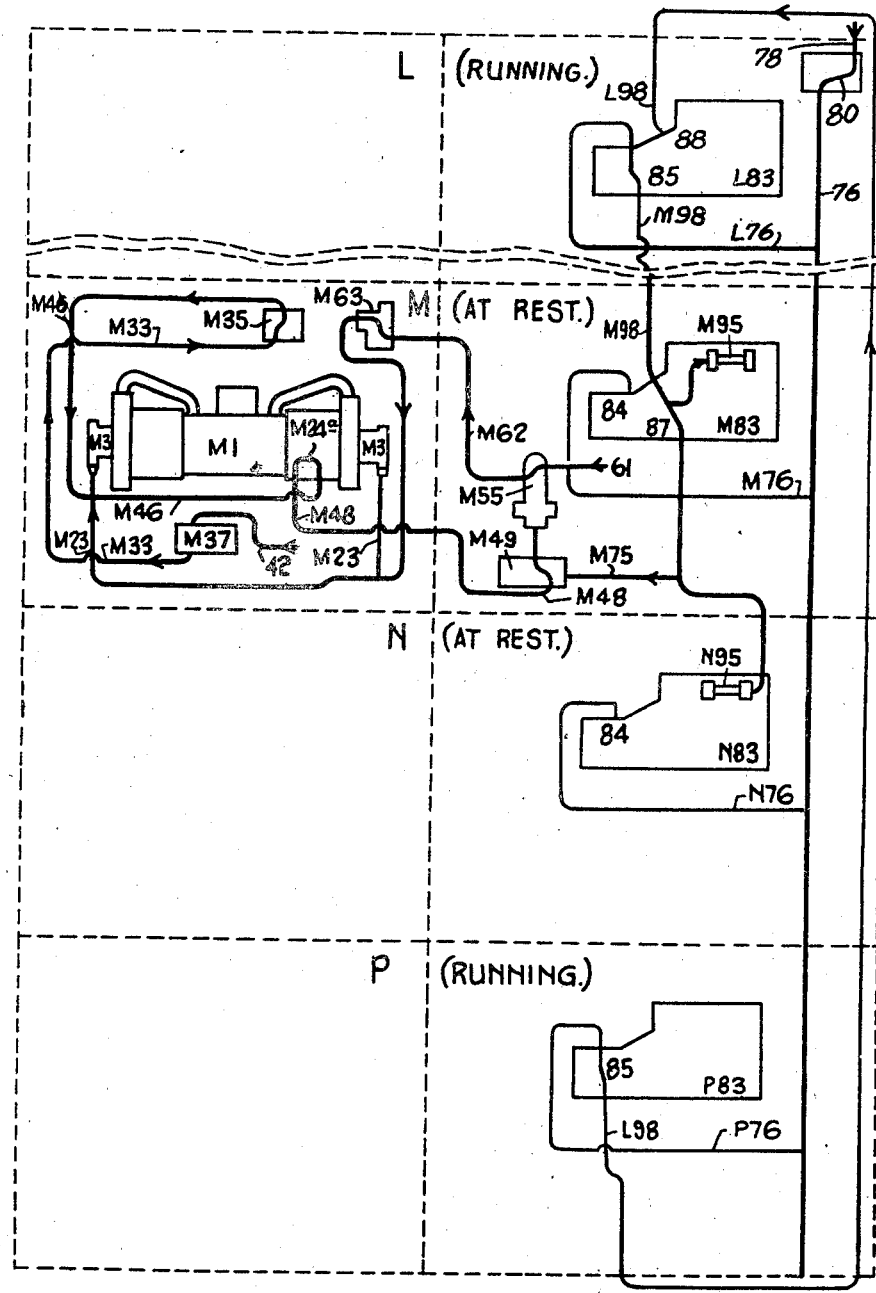
FIG. 6ª

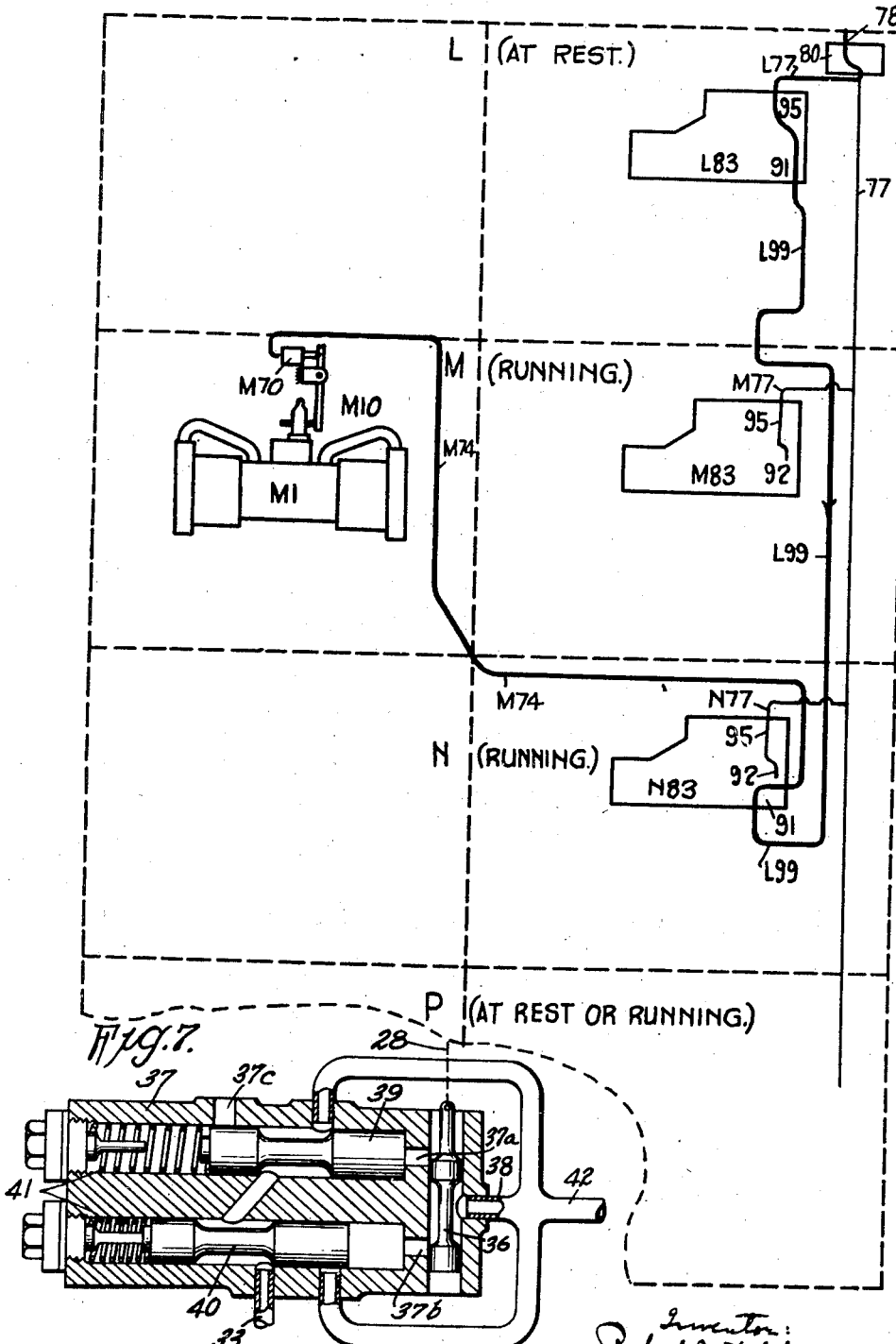

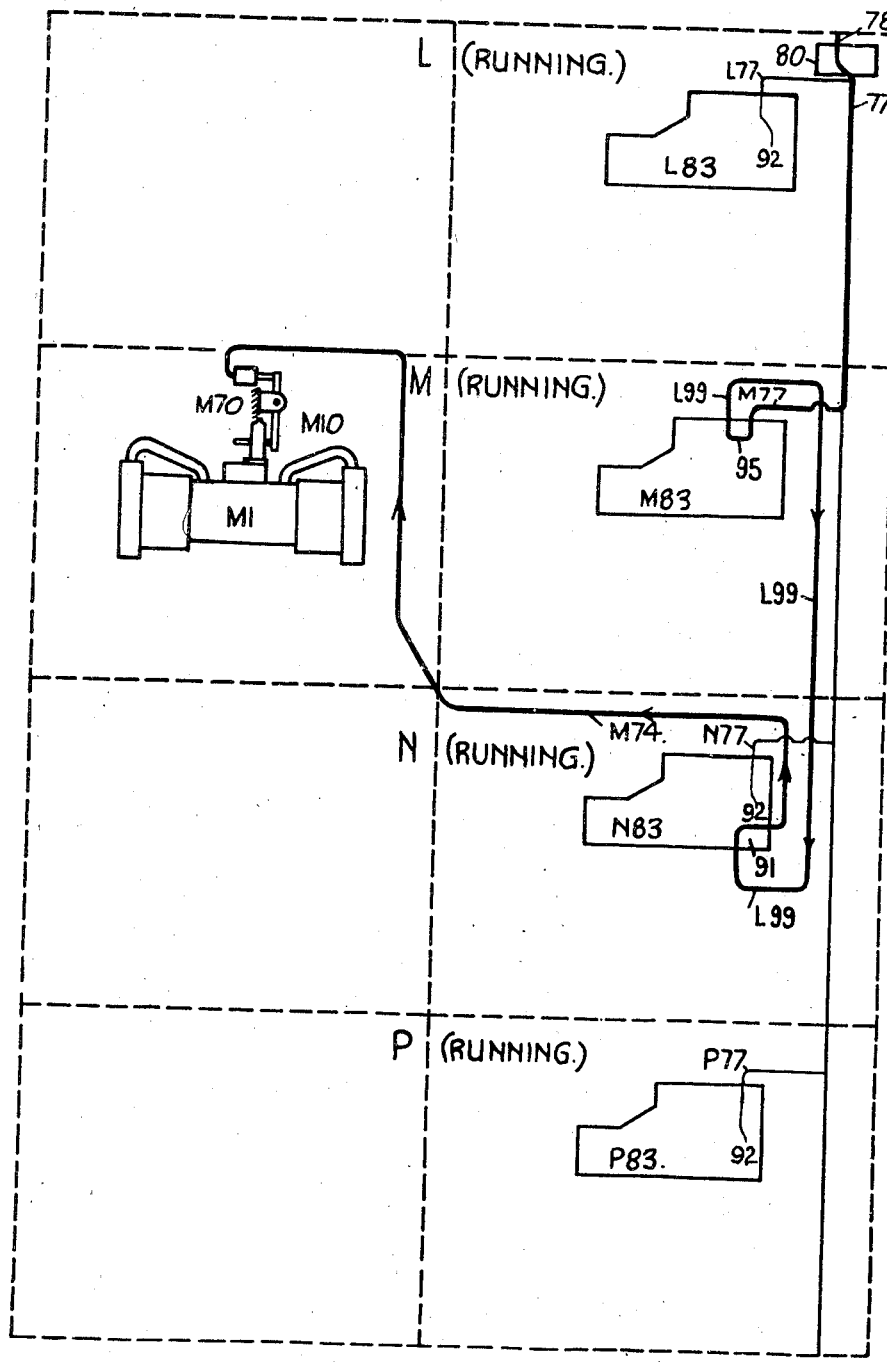
FIG. 7ª

Patented Jan. 20, 1948

2,434,778

UNITED STATES PATENT OFFICE 2,434,778

POWER PLANT

Robert James Welsh, Rugby, England, assignor to The English Electric Company Limited, London, England, a British company Application July 24, 1944, Serial No. 546,360
In Great Britain October 28, 1942

7 Claims. (Cl. 230—56)

This invention relates to the operation of power plant made up of components of which the number in operation is variable—e. g. in accordance with the load on the plant.

One aim of the invention is to provide simpler means than hitherto known tending to equalise the length of time during which individual components are in operation by ensuring that the components start and stop in the same cyclic order.

Thus assuming that a plant comprises components LMNP, the plant could be operated so that component L alone is in operation to meet the minimum load on the plant, components L and M are in operation together when the load exceeds a certain value and the remaining components are brought into operation successively as desired with further increases of load, the components being progressively stopped in reverse order with decreases in load. With such a mode of operation, component L would be substantially continuously in operation, component P very seldom in operation and the other components in operation for varying times. Preferably, however, the components are started and stopped in the same cyclic order. Thus, for example, if the chosen order be L—M—N—P, then when components M and N are in operation an increase of load beyond their combined capacity is met by starting component P and a subsequent increase by starting component L, while a decrease in load below a predetermined value while only M, N and P are in action is met by the stopping or putting out of action of component M and subsequent decreases by the putting out of action of component N. The object of the present invention is to achieve the desired starting and stopping in cyclic order by providing each component with its own individual control device of a simple kind whereby any desired power plant can be built up by taking the desired number of components each with its individual control device and appropriately connecting these devices together.

The power components may be internal combustion engines and may each drive and be combined with compressors to serve as gas generators, the whole plant forming a combination for generating gas under pressure for utilisation for any purpose—e. g. as the motive gas for a separate prime mover. Another object of the invention is to provide such a plant in combination with control means which will start and stop power components in a prearranged sequence in response to successive starting signalling impulses and stopping signalling impulses. Each engine will have its individual starting relay and if the engine be of the fuel-injection compression-ignition type, the starting relay may set in action the usual means for momentarily supplying compressed air to set the engine piston or pistons initially in motion, while at the same time bringing on the fuel supply; the stopping device shuts off the fuel supply.

The power plant according to the invention wherein each component is an internal combustion compressor of the known free-piston type is illustrated by the accompanying drawings Figs. 1–7a of which:

Fig. 2a shows a detail of Fig. 2 on a larger scale.

Fig. 3 is an enlarged detailed sectional view of the apparatus in the top right-hand rectangle of Fig. 1, while

Figures 5, 6:
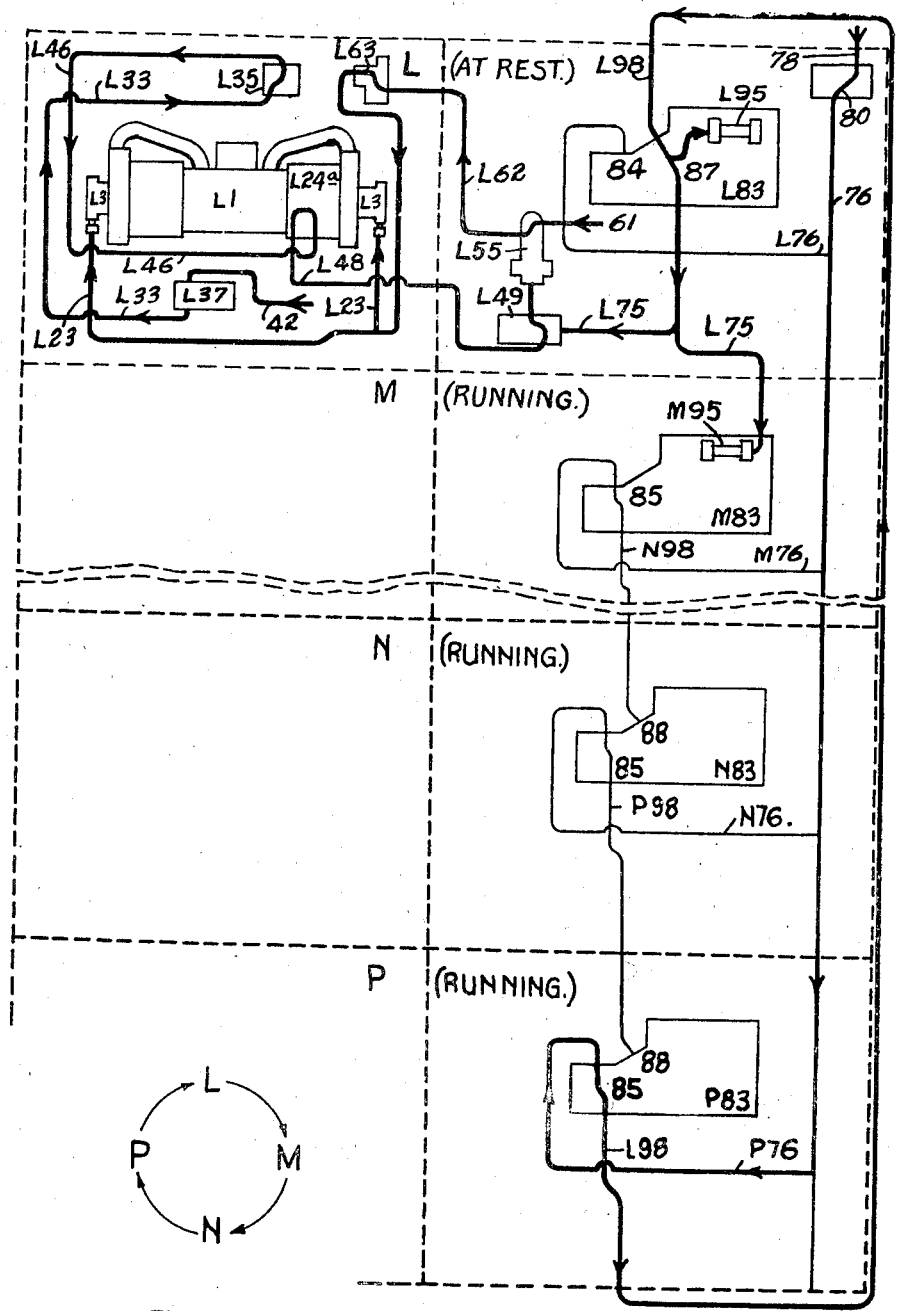

Fig. 5 is a purely diagrammatic and explanatory drawing illustrating the cyclic order of operation of power units. Figs. 6, 6a, 7 and 7a are also purely diagrammatic: Figs. 6 and 6a show the operative connections for starting in predetermined cyclic order and Figs. 7 and 7a the operative connections for stopping in predetermined cyclic order, according to the invention, of those parts of Fig. 1 which control the cyclic starting and stopping according to the invention.

Figure 2:
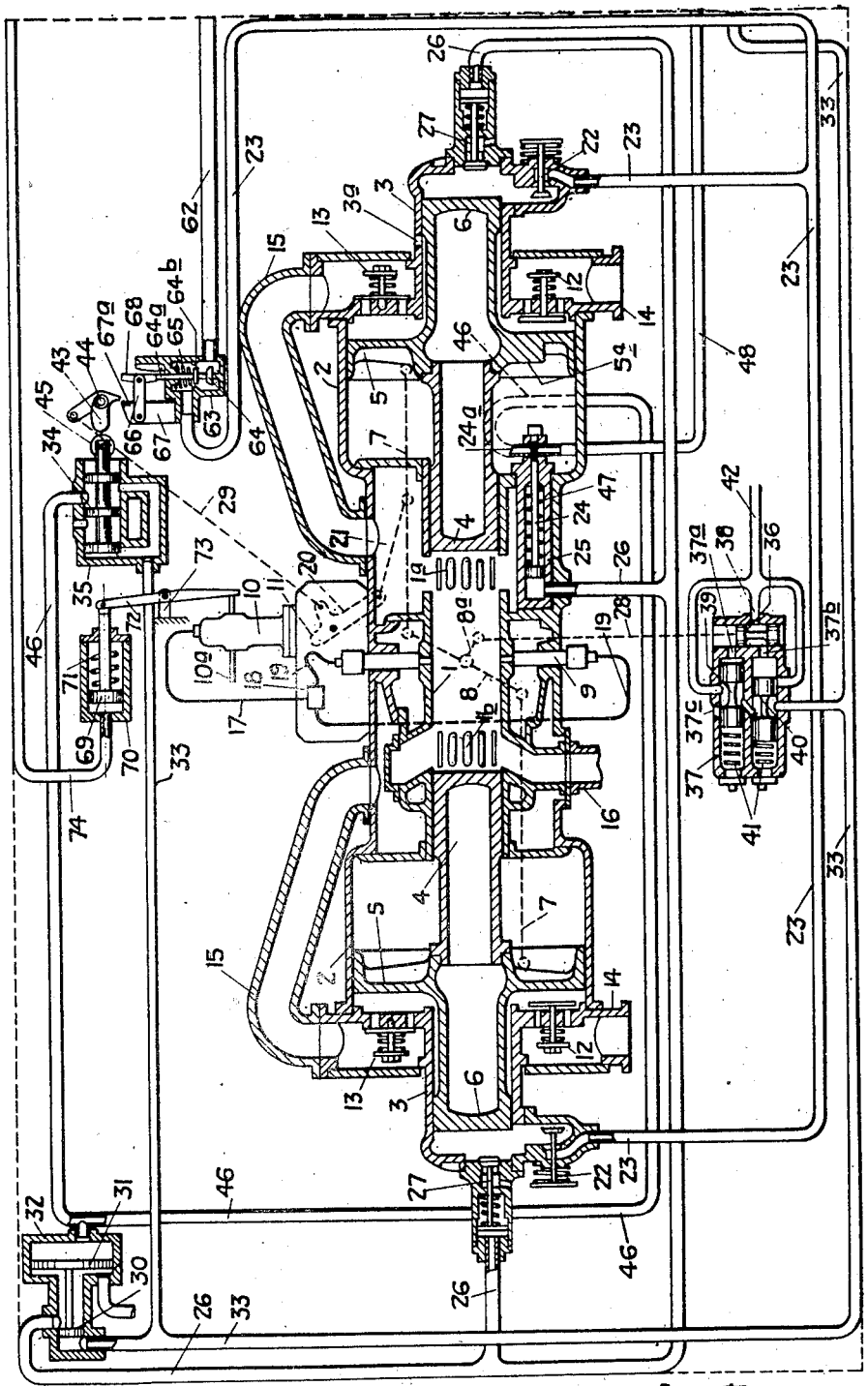
Fig. 2 is an enlarged detailed sectional view of the apparatus in any one of the left-hand rectangles of Fig. 1.

Referring first of all to Fig. 5, the cyclic order of the power units L, M, N, P, is indicated by the clockwise direction of the arrows showing for example that, with units M and N working, P would be the next one to be started, and then L. Referring now to Fig. 2, the body of the free piston type internal combustion compressor comprises the engine cylinder 1, the pair of compressor cylinders 2 at opposite ends thereof and the pair of buffer cylinders 3 at the extreme outer ends, while each free piston unit consists of one of the opposed engine pistons 4 reciprocating in cylinder 1, a compressor piston 5 reciprocating in one of the cylinders 2 and a buffer piston 6 reciprocating in one of the cylinders 3. In the head of each compressor cylinder 2 is at least one inlet valve 12 which can put the cylinder 2 in communication with the suction inlet 14 and at least one discharge valve 13 which can put the cylinder 2 in communication with the conduits 15 communicating with the annular space surrounding the ring of inlet ports 1a in the engine cylinder 1. The rings of exhaust ports 1b in the latter open into an annular space communicating with the discharge conduit 16.

The reciprocating piston units are synchronized in well known and usual manner by being linked by the pair of links 7 to the opposite ends of the lever 8 having its mid point pivotally supported on the outside part of the engine cylinder 1.

Fuel can be injected into the cylinder 1 by fuel injectors 9 of conventional form supplied through fuel pipe 17, the usual form of distributor 18 and the fuel pipes 19 by the fuel injection pump 10 of conventional form reciprocated by cam 11 which is oscillated (in accordance with the movement of the free piston units) by the bell-crank lever 20 which is connected by link 21 to a point on one of the links 7. The quantity of fuel injected by each stroke of the injection pump 10 is determined in the usual manner by the position of the fuel rack 10a.

Each buffer cylinder 3 is provided with an opening controlled by the non-return valve 22 forming an inlet valve through which compressed air can be admitted from pipe 23 for starting the engine. In addition, each buffer cylinder has a vent governed by the compression relief valve 27 which can be opened by the application of fluid pressure from pipe 26.

A barring piston 24 movable in cylinder 25 is provided for moving the opposed piston units apart and out to the extreme outer end of their stroke on the stopping of the engine; the pistons are left in this position ready for restarting. This resetting operation is performed in response to the application of fluid pressure (which is supplied by any known source of pressure such as any suitable oil pump, not shown in the drawing for simplicity) to the cylinder 25 through resetting control pipe 26 which, while the engine is running, is disconnected from the fluid supply and connected to exhaust the fluid into a reservoir (not shown) connected with the suction side of the source of pressure; when the engine stops and so long as it is at rest, the pipe 26 is connected to the supply by the "running indicator" 37 as hereinafter described with reference to Figures 2 and 2a. The resetting is controlled by a "barring relay"—comprising a valve device made up of pistons 30 and 31 movable in cylinder body 32 by the application of fluid pressure thereto from pipe 33—in co-operation with an "end of stroke indicator" comprising a triple piston valve 34 movable in cylinder 35, partly by the application of fluid pressure thereto from pipe 33, and partly by the action—through link 29—of the opposed pistons when they reach or closely approach their outer dead centre position.

The "running indicator" (Figure 2a) is a hydraulic device comprising piston valve 36 reciprocated by the link 28 in a transverse cylinder in the body 37. In one extreme position this valve 36 connects one of two longitudinal cylinders in the same body to fluid pressure suppply pipe 38 through a comparatively restricted orifice 37b and the other of said cylinders to exhaust through a similar orifice 37a; in the other extreme position the valve 36 reverses these connections while during its movement from one position to the other the valve temporarily connects both cylinders to exhaust. In each cylinder is one of a pair of double pistons 39 and 40 which, under fluid pressure through orifices 37a and 37b, can move outwards against a very light biasing force provided by springs 41. These pistons form valves which serve together to connect the pipe 33 to exhaust 37c only when applied pressure has moved both pistons out; when either is held in by the biasing force of spring 41, the pipe 33 is connected to the fluid pressure pipe 42, which is supplied by any known source of pressure such as any suitable oil pump, not shown in the drawing for simplicity. When the engine is at rest the control valve 36 can only be in a position in which at least one of the said cylinders of the "running indicator" is connected to exhaust, and so the pipe 33 will be connected to pressure. When the engine is running and the control valve 36 is reciprocating the said cylinders are connected alternately to pressure and to exhaust but they are not connected to the exhaust long enough through the restricted orifices 37a and 37b for the light biasing force of springs 41 to impart any appreciable inward movement to either piston; accordingly both pistons remain out and the pipe 33 remains connected to exhaust by the port 37c in the body 37.

The fluid pressure in pipe 33—as soon as the engine stops—moves the piston unit 34 of the "end of stroke indicator" outward to a position in which it can be operated by motion of the free pistons. The fluid pressure in pipe 33, by acting on the smaller piston 30 of the "barring relay" moves this also in one direction, to allow the fluid pressure to pass by way of pipe 26 to open the compression relief valves 27 in the buffer cylinders and also to enter the barring cylinder 25, thus causing the barring piston 24 to move outwards to bear on a shoulder 5a on the inner side of the right hand compressor piston 5 (which is linked to the left hand compressor piston 5 by the linkage 7, 8, 7 indicated in dotted lines in Fig. 2) so as to drive the free pistons to their outer dead centre position. When the free pistons approach or reach their outer dead centre position a cam 43 actuated by them through link 29 and the lever 20 connected by the link 21 to the synchronising linkage, is rocked about the fixed pivot 44 to engage a roller 45 on the projecting end of the piston rod of the "end of stroke indicator," forcing the triple piston 34 inwards to the position shown and thereby connecting the fluid pressure from pipe 33 by way of pipe 46 to a rear part of the barring relay, behind the piston 31, which is shown as of greater area than the front piston 30 so that the force from the rear will overcome that from the front. The latter relay is thus moved back to its normal position (as shown) to disconnect pipe 26 and the barring cylinder 25 from the pipe 33 and to connect them to exhaust, whereby the barring piston 24 is withdrawn by the action of a biasing force such as that of a spring 47 and the relief valves 27 in the buffer cylinders 3 can reclose. The barring piston 24, when completely withdrawn, re-establishes a connection from the pipe 33 through the "end of stroke indicator" cylinder 35, pipe 46, and ports uncovered and put into communication by the reduced portion 24a of the piston rod of the barring piston 24—to pipe 48 and a port in a "starting relay" 49 hereinafter described with reference to Fig. 3. When the barring piston and co-operating parts have gone through the operations described the whole equipment is then reset and ready for restarting, the resetting having taken place automatically in immediate response to the stopping of the engine.

Figure 3:
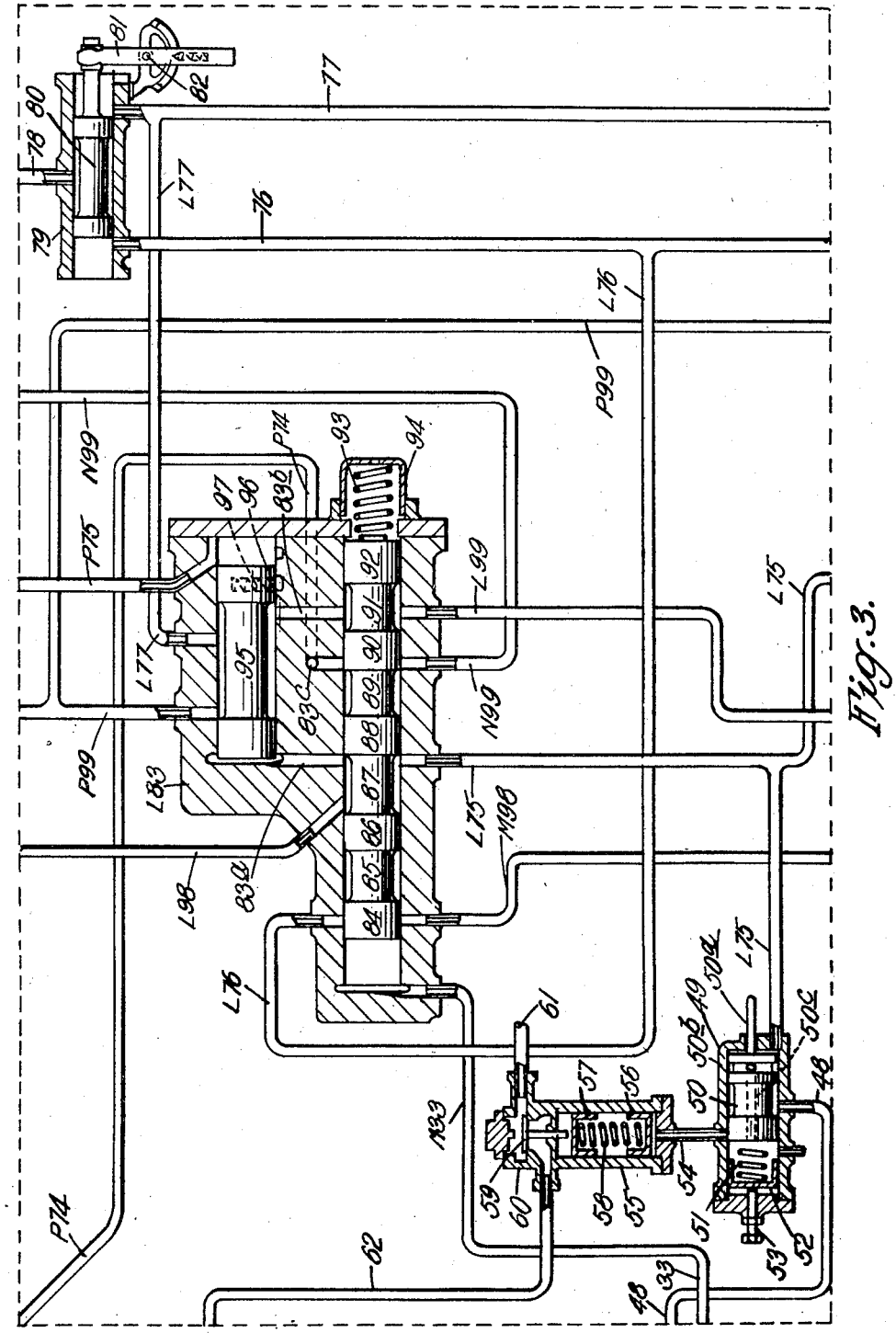

Referring now also to Fig. 3, the signalling impulse to restart the engine is given by the application of fluid pressure to the port in the right-hand end of the cylinder 49 of the starting relay; the resulting movement to the left of piston valve 50 in the cylinder 49 against the force of spring 51 (which bears against the abutment 52 adjustable by screw 53) puts the said pipe 48 in communication through pipe 54 with the cylinder 55 of the servo-motor for actuating the starting valve. Movable within cylinder 55 is a piston unit made up of parts 56 and 57 with spring 58 compressed between them; the part 57 can engage the stem of starting valve 59 which, when the valve is closed, rests on a seating in the valve casing 60. Provided that the corresponding "running indicator" 37 (Fig. 2) is in the "rest" position, that the "end of stroke indicator" 35 is in the position corresponding to the free pistons being in the outer dead centre position and that the barring piston 24 is fully withdrawn, it will be clear that when a signalling impulse to restart the compressor is applied through pipe L75 fluid under pressure can then pass from the supply pipe 42 through the pipes 33, 46, 48 and 54 (Fig. 3) to the cylinder 55 and so cause piston part 57 to lift the starting valve 59 off its seating. Compressed air for starting purposes from pressure pipe 61—which constitutes a source of comparatively unrestricted capacity—is hence admitted to the now closed buffer cylinders 3, by way of pipe 62, the body 63 of a "timing valve" 64 (Fig. 2) provided for subsequently cutting off the air supply to the cylinders 3, the pipe 23 and non-return starting inlet valves 22.

The "timing valve" 64 has three positions in the body 63, viz: (1) closed, (2) fully open, and (3) wholly released; it is biased to position (3)—in which it is shown—by a spring 65 which holds the valve considerably clear of its seating. The valve device includes a lever 66 pivotally mounted outside the valve casing on a lug 67 extending therefrom; a trigger 68 is pivotally mounted on this lever and normally positioned directly adjacent to the end of the stem 64a of valve 64, which stem projects through the valve casing 63. The lever 66 is biased by gravity to a position in which the trigger 68 abuts against the valve stem 64a but the lever is free to make a small movement until arrested by a stop 67a formed by the lug 67. The pressure of the air entering body 63 from pipe 62 acts on the "timing valve" 64 itself to move it (against the biasing force of spring 65) from position (3) to its position (2) or "fully open" position, thus allowing air to pass by pipe 23 to the buffer cylinders 3. Preferably in position (3) a collar 64b on the valve stem 64a lying within and considerably restricting the valve aperture acts to delay the building up of pressure on the discharge side of the "timing valve" thereby accelerating the opening movement of this valve while at the same time delaying the initial movement of the free pistons by delaying the building up of air pressure in the buffer cylinders. This also eliminates the risk of the free pistons moving so quickly as to be beyond the correct position for cutting off the starting air before tripping the trigger as described below. The valve stem 64a, during the movement of the valve to the open position, bears against the trigger 68 which with lever 66 and lug 67 thus acts as a stop. The thrust of the valve stem 64a against the trigger 68 is on a line passing through the pivot of the trigger which therefore does not turn about its pivot but the lever 66 moves until arrested by the stop 67a on lug 67. This movement of the valve and trigger, by which the valve moves to but is held in the fully open position, brings a part of the trigger 68 into the path of a part of the cam 43 actuated by the free pistons through link 29. As the pistons pass a certain point before reaching the inner dead centre position, the trigger 68 is accordingly engaged by cam 43 and turned about its pivot on lever 66 so that it releases the "timing valve" 64, allowing the latter, under the action of the air pressure, to continue its movement to the first or closed position whereby the buffer cylinders 3 are no longer connected to the pipe 62 and the pressure pipe 61. The valve stem 64a then bears on the trigger 68 in such a way as to hold it out of the path of the cam 43 as the latter oscillates. It will be seen that the starting air supply is cut off and the "timing valve" mechanism does not interfere with subsequent normal operation of the free piston device. Subsequent reclosure of the "master starting valve" 59 (Fig. 3, cutting off the supply of air) allows the "timing valve" 64 (Fig. 2) to return under the action of its biasing spring 65 and together with the lever 66 and trigger 68 to the wholly disengaged position so that the trigger remains out of the path of the member adapted to engage it. The movement of the free pistons will actuate the "running indicator" 37 in the manner already described to disconnect the pipe 33 from the supply pipe 42 and connect it to exhaust. Pressure is thus removed from the piston unit 34 of the "end of stroke indicator," which will accordingly remain in the withdrawn position and be unaffected by the subsequent operation of the engine, and from pipes 46, 48 and 54 (Fig. 3) so that the pistons 56 and 57 will allow the "master starting valve" 59 to reclose.

The engine is stopped by temporarily cutting off the fuel supply by moving the fuel rack 10a to the position in which the pump 10 delivers no fuel. This is done by the stopping piston 69 (Fig. 2) which can move in the cylinder body 70 (forming the stopping relay) against the force of spring 71 when fluid pressure is applied to the relay from pipe 74; this movement is communicated to the fuel rack 10a by the lever 72 turning about fixed pivot 73.

Figure 1:
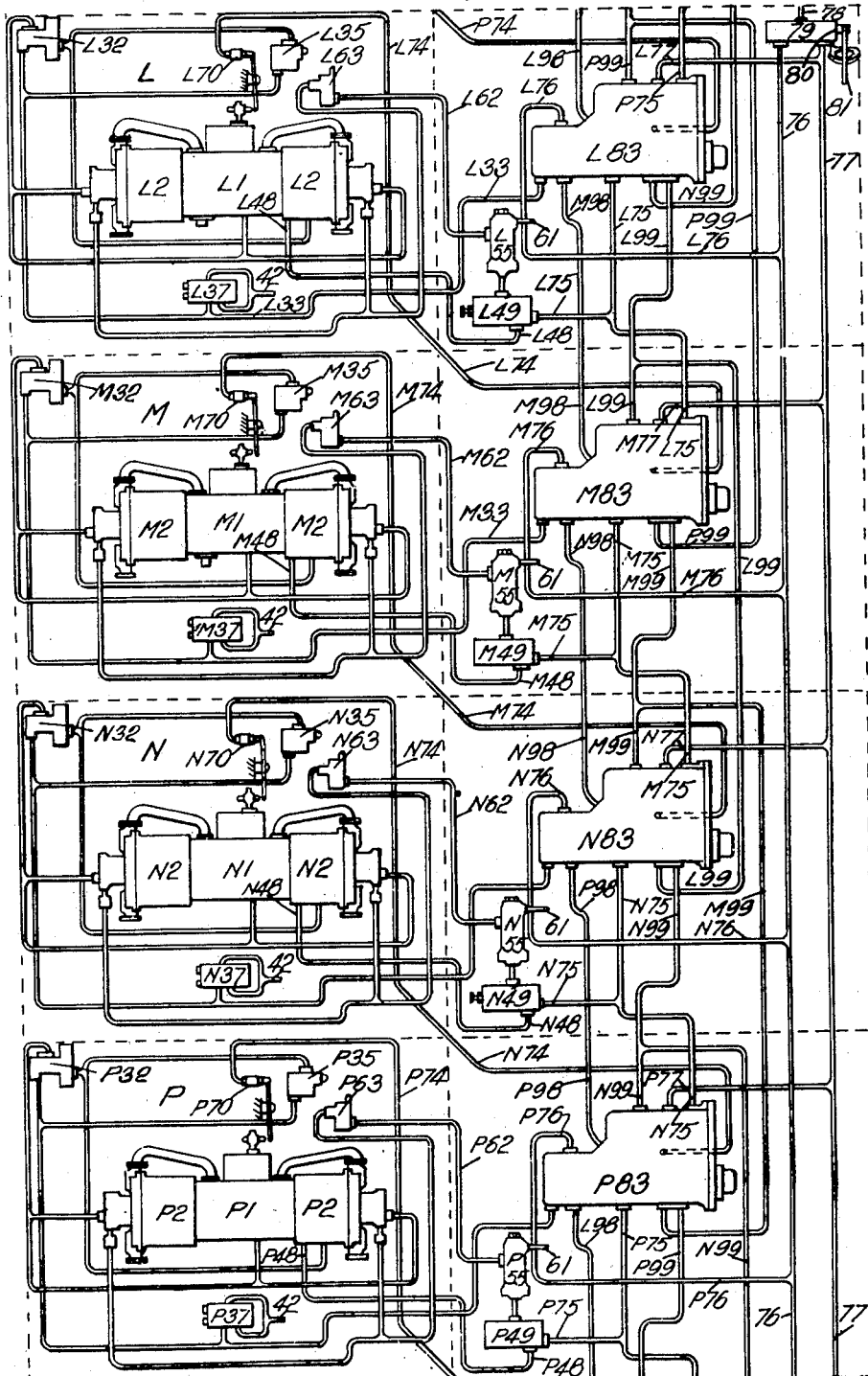
Fig. 1 is an outline drawing of the complete power plant comprising similar components L—M—N and P, which are shown in the left-hand four of the eight rectangles into which the figure is divided, the control element corresponding to each component being shown in the adjoining right-hand rectangle.

Thus it will be seen from the foregoing that each of the power components L—M—N—P can be stopped by the application of a stopping signalling impulse to the stopping relay 70 by pipe 74 (Fig. 2), the parts being automatically reset in a condition for restarting, and each can be restarted by the application of a starting signalling impulse to the starting relay 49 by pipe L75 (Fig. 3). In Fig. 1 the principal parts shown in the other figures are marked on each of the power components and its associated parts with the same reference numerals as on the other figures but with the parts for different components differentiated by being prefixed by the appropriate reference letter L, M, N or P; thus the stopping device for component L is designated L70, the starting relay therefor L49 and the pipes thereto L74 and L75 respectively while the stopping device for component M is designated M70 and so on. The starting and stopping signalling impulses are applied to the various devices L49, L70, etc. from the starting and stopping signalling impulse lines 76 and 77 common to the whole plant, which lines are pipes either of which can be connected to the fluid pressure supply pipe 78 by the signalling impulse transmitting valve device 79 (shown in section in Fig. 3) in the body of which can be moved the piston valve 80—e. g. by the lever 81 turning about the fixed pivot 82. The connecting lines from the starting and stopping signalling impulse lines to the starting and stopping devices are controlled by the control devices L83, M83, etc. indicated in outline in Fig. 1 in such manner that the power components will start in cyclic order L—M—N—P—M etc. in response to successive starting signalling impulses or one long sustained starting signalling impulse and will stop in the same cyclic order in response to separate stopping signalling impulses or one long sustained stopping signalling impulse, the first power component to start being thus also the first to stop.

All the devices 83 are the same in construction. The device L83 is shown in section in Fig. 3 in the condition corresponding to the power component L being at rest while the device M83 is shown in section in Fig. 4 in the condition corresponding to the power component M being in operation; from these figures the form and operation of all these devices can be understood.

Each device 83 includes a biased control member in the form of a multiple piston valve made up of four recessed or "valve" parts 85, 87, 89 and 91 integral with and sandwiched between the piston parts 84, 86, 88, 90 and 92, the whole member being biased to the left (as in the device M83 shown in Fig. 4) in a cylinder formed in the body of the device by the spring 93 compressed between the piston 92 and the cylinder cap 94 but slidable to the right against the biasing force (as in the device L83 shown in Fig. 3) when fluid pressure is applied to piston 84 by way of pipe 33 from a running indicator 37 (Fig. 1). Each device 83 also includes a throw-over type control device in the form of a piston valve 95 movable in another cylinder formed in the same body. Connecting ports 83a and 83b are provided between the two cylinders. The piston valve 95 moves to the left, as in Fig. 3, on application of fluid pressure to the right hand end of the piston, and to the right as in Fig. 4 on application of pressure to the left hand end. A ball catch 96 urged outwards by spring 97 from piston valve 95 can partly enter one or other of two slight depressions in the cylinder wall to assist in retaining the piston 95 in position at each end of its stroke.

In all the figures the connections from the signalling impulse lines 76 and 77 to the devices 83 and the connections between these devices are indicated by references made up of numerals which are the same for all corresponding connections and prefixes L, M, etc. distinguishing certain connections to one device from the corresponding connections to the other devices.

Operation

Figure 4:
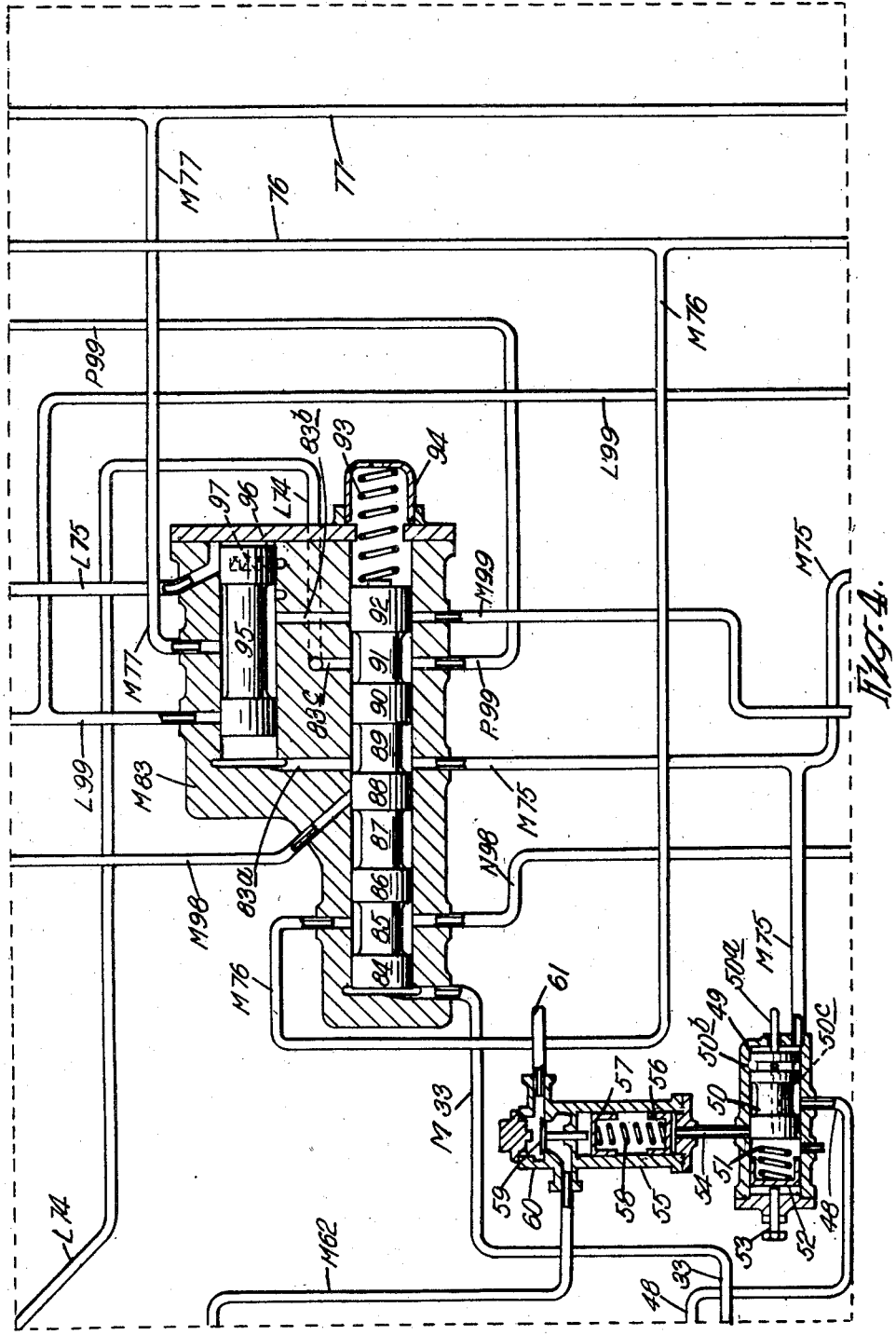
Fig. 4 is a similar view of one of the other right-hand rectangles.

The operations of starting and stopping can be understood by tracing through the connections with reference to Fig. 1, reference being made to Figs. 3 and 4 for an understanding of the actual functions of the devices 83, but understanding will be facilitated by referring also to Figs. 6, 6a, 7 and 7a which show purely schematically and with the same reference indications the connections shown in Fig. 1; the dotted lines divide Figs. 6, 6a, 7 and 7a into the rectangles corresponding to the rectangles of Fig. 1.

Thick full lines in Figs. 6, 6a, 7 and 7a show the actual path of pressure to a device or component operated by it, whereas thin full lines indicate pipes set under pressure but cut off from the next device.

Assuming, for example, power units M, N, P to be working, and L to be the only one at rest (Fig. 6). If now the power demand rises further so as to require the operation of all units, a starting signalling impulse is to be given to power unit L whereas the other units, being in operation already, do not require any such impulse.

For this purpose the pressure supply line 78 is temporarily connected (by an automatic governor or manually by the operator) through valve 80 with pipe 76, which is the starting signalling impulse line and transmits the signalling impulse to all of the branch lines L76, M76, N76, P76.

As power unit L is supposed to be at rest, the lower piston valves 84—92 of its device L83 are in the position as shown in Fig. 3 where line L76 is cut off from line M98 by piston 84. Power units M, N and P, however, being in operation, the lower piston valves 84—92 of their devices M83, N83, P83 are in the position of Fig. 4. Accordingly the signalling impulse from line 76 can get through via lines M76, N76, P76, the respective valve portions 85, to lines N98, P98 and L98, respectively.

However, lines N98 and P98 are cut off by pistons 88 from lines N75 and P75 (Fig. 4), and only L98 communicates through valve portion 87 (Fig. 3) with L75 which transmits the signalling impulse to valve L49 whose piston 50 is pushed to the left.

Thereby line L48 is brought in communication with pipe 54 and with the space in cylinder 55 below piston 56.

Pressure is thus applied from line 42 through the "running indicator" L37 being in "at rest" position, pipe L33, the "end of stroke indicator" L35, pipe L46 and the reduced portion L24a of the barring piston to pipe L48 and the "starting relay" L49 and the cylinder L55 of the master starting valve.

Accordingly valve 59 is lifted off its seat and compressed air enters, from pipe 61, into line L62, passes the timing valve L63 and eventually reaches, through pipes L23, the cushion cylinders L3 whereby the unit L is started.

Assuming now L, M and N had been at rest and only P working. In this case lines M76 and N76 would have been stopped already by piston 84 of M83 and N83, respectively but otherwise the conditions of Fig. 6 would apply, i. e. line P76 would be ready to function and again unit L would be the next one to be started, in accordance with the diagram Fig. 5.

As soon as unit L was working, unit M would be the next one to be started in the cyclic order of Fig. 5. If now the signalling impulse in line 76 were repeated (or the signalling impulse that had started unit L were sustained) all references L, M, N, P would have to progress one step in the cyclic order of Fig. 5 to match the new condition which is shown in Fig. 6a where power units M and N are assumed to be at rest and units P and L to be running. After unit M was started, another step in the cyclic order of Fig. 5 would have been made, and what has been described hereabove for the starting of unit L (Fig. 6) and M (Fig. 6a) would then apply to unit N until all units were operating.

Considering again an initial condition in which component L is at rest and the other components are in action, the operation resulting from applying a stopping signalling impulse to the stopping signalling impulse line 77 is as follows Fig. 7:

Pressure is applied from line 77, through the lines L77, M77, etc. branching therefrom, to all the devices L83, M83, etc. and can pass to the lower cylinder of each through the connecting port 83b. With component L at rest and the lower piston of device L83 in the condition shown in Fig. 3 the pressure is transmitted through valve part 91 to line L99; the latter goes to device N83 (with a branch to device M83 of which the purpose is explained hereinafter with reference to Fig. 7a) and since the component N is running and device N83 is in the same condition as device M83 shown in Fig. 4 the pressure is transmitted from line L99 of Fig. 7 (corresponding to P99 in Fig. 4) by way of valve part 91 of device N83, through the port 83c to the line M74 of Fig. 7 (corresponding to L74 of Fig. 4) and thence to the stopping relay M70, to cause component M to stop. The pressure will, however, not be transmitted from branch 77 as the lower piston of device M83 will be in the position of Fig. 4 where piston 92 blocks the path to the line M99, and no stopping signalling impulse will be transmitted to stopping relay N70; since the devices N83 and P83 are in the same state as device M83 stopping signalling impulses will likewise not be transmitted to stopping relays P70 and L70.

After the stopping of component M the device M83 will be in the same state as device L83 (i. e. as shown in Fig. 3) and from the foregoing description it will be understood that a subsequent stopping signalling impulse will pass from line M77 via 83b and 91 of M83 to line M99 and then by way of device P83 to line N74 and stopping relay N70 so that component N will be stopped. In other words, the conditions of Fig. 7 would apply again with the difference that all the references L, M, N, P would have progressed one step in the cyclic order of Fig. 5. The same stopping signalling impulse will also pass, as already described, to line L99 and hence to the stopping relay M70 which will be ineffective since component M has already stopped. It is assumed that a stopping signalling impulse can be applied harmlessly to the stopping means for a component already at rest and that accordingly there is no need to provide a control member on each of the devices 83 to prevent the passing of a stopping signalling impulse to an associated device when it is at rest—thus performing the same function for the stopping signalling impulses as valve part 87 for a starting signalling impulse.

The function of the throw-over valve member 95 is to determine the stopping of the proper component when all are in operation. When, with components M, N and P in action, the component L is started as already described, the pressure applied to line L98, Fig. 3, is transmitted—through the port 83a of device L83—to the left hand end of valve member 95 of device L83 so that this member is moved to the right (as shown in Figs. 4 and 6) while at the same time the pressure transmitted from line L98 to line L75 and the associated starting device 49 is also transmitted (Fig. 6) (through that branch of line L75 which goes to device M83) to the right hand end of valve member 95 of device M83 so that this member is moved to the left (as shown in Fig. 3). The previous starting of the other components will have moved the other valve members 95 to the right so that only the one in device M83 will be in the left hand position. After the starting of component L and the removal of pressure from line L33 by the action of the running indicator 37 (Fig. 2) the multiple valve member in device L83 will move to the left (as shown in Fig. 4) and take up the same position as these members in all the other devices M83 etc. When the next stopping signalling impulse is given pressure cannot be transmitted from line L77 by way of valve member 91 in device L83 to line L99 (piston 92 barring the path) and so to the stopping device 70 of the component M—which should be the next to stop; without the throw-over valve members 95 no stopping signalling impulse would then be effective. Pressure can however now reach line L99 from line M77 by way of member 95 in device M83 (Fig. 7a) and can pass through this line to stopping relay M70 by the route already described. Thus when all the power components are in action a stopping signalling impulse is transmitted—by a throw-over device—to the stopping relay of that component which in cyclic order, is next to the last one to start— i. e. the stopping relay of that component which started first. Thus, by starting and stopping the individual power components in cyclic order as described above, the lengths of time during which such individual power components are in operation are substantially equalised.

Repeated stopping signalling impulses or one long sustained stopping signal will stop the components one by one until only one is in action. Assume that only component P is in action. From what has already been described the path of a stopping signal can be traced on Fig. 1 from line N77 (by way of valve member 91 of device N83) through line N99 to device L83 where, since component L is at rest, pressure will be prevented by piston 90 (Fig. 3) from passing (by way of valve member 91 of device L83) to line P74 and so to stopping relay P70. Hence the plant cannot be completely shut down by the stopping of the last component—e. g. component P—except by the action of an attendant who can move the appropriate lever 72 (see Fig. 2) by hand to move the fuel rack 10a to the no-fuel position.

With all the components at rest, a starting signalling impulse will be ineffective with the particular arrangement illustrated and described. An attendant, however, can at will initiate the starting of any one component by moving by hand, the piston rod 50a projecting from the piston 50 of one of the starting relays 49 (Figs. 3, 4); thereafter, starting and stopping signalling impulses should cause the components to start and stop in the predetermined cyclic order. When a component is at rest, fluid pressure is connected to the associated starting relay 49 through one of the pipes 48, from the associated running indicator 37; to prevent leakage of pressure fluid into the space at the right hand end of the relay cylinder (to which the associated pipe 75 is connected) causing a false starting movement to be given to piston 50, the latter has an annular groove 50b communicating through aperture 50c with the space at the left hand end of the cylinder.

What I claim as my invention and desire to secure by Letters Patent is:

1. Power plant comprising a plurality of internal-combustion compressors, compressed-air starting means for each, fuel cut-off means for each, said means being each responsive to a fluid-pressure signalling impulse, and a fluid-pressureresponsive start-and-stop control device for each, in combination with a starting signalling impulse pipe, a stopping signalling impulse pipe, signalling impulse transmitter means applying fluid pressure temporarily and selectively to each of these signalling impulse pipes, a pipe connection to the said fuel cut-off means for each internal-combustion compressor from said stopping signalling impulse pipe through said control device for that compressor, a connection to the said starting means for each said internal-combustion compressor from said starting signalling impulse pipe also through said control device for that compressor, a valve in each said start-and-stop control device having a first position blocking said connection to the starting means and a second position blocking said connection to the fuel cut-off means, a throw-over valve in each said control device having open and closed positions, said throw-over valve when open completing said connection to the stopping means independently of the first said valve, means for moving the first said valve to its first position when that compressor device which precedes in a fixed cyclic order the compressor device controlled by the valve is at rest and to its second position when said preceding compressor is in action, means for moving said throw-over valve to its closed position in response to the starting of the compressor which it controls and means for moving said throw-over valve to its open position in response to the starting of said preceding compressor.

2. Power plant comprising in combination a plurality of internal-combustion compressor devices, a fluid-pressure-operated starting device and stopping device for each, a starting signalling impulse pipe, a stopping signalling impulse pipe, valve means for connecting fluid pressure temporarily to either of these pipes, a pair of pipe connections for each said compressor, one pipe of this pair going from said stopping signalling impulse pipe to the stopping device and the other from said starting signalling impulse pipe to the starting device of the associated compressor, a piston valve in each said pair of pipe connections having a first position blocking the fluid path to the starting device of said associated compressor and a second position blocking the fluid path to the stopping device of said associated compressor, a spring biasing said piston valve to its first position, means for applying fluid pressure to each said piston valve in opposition to said spring, valve means for cutting off said fluid pressure in response to the running of the compressor device which precedes the said associated compressor device in a predetermined cyclic order, a throw-over valve in said pair of pipe connections having a position in which it establishes the fluid path to the stopping device of the said associated compressor irrespective of the position of said spring-biased piston valve, means for moving said throw-over valve away from said position in response to the starting of said associated compressor and means for moving it to said position in response to the starting of said preceding compressor.

3. Power plant according to claim 1 wherein said control device for each compressor comprises a valve body having two cylinders formed therein with connecting ports between the cylinders, a multiple piston valve slidable in the one cylinder and forming the first said valve, a biasing spring between said piston valve and said valve body, means for applying fluid pressure to an end face of said piston valve in opposition to said spring and another piston valve movable under fluid pressure in the second cylinder and constituting said throw-over valve.

4. Power plant comprising a plurality of internal combustion compressor units, a common source of compressed air supply, a common source of fluid pressure, a common starting signalling impulse line, a common stopping signalling impulse line and means adapted to connect, temporarily and alternatively, the said signalling impulse lines with the said source of fluid pressure, each of the said internal combustion compressor units including a starting device and a stopping device adapted to be selectively connected with one of the said starting and stopping signalling impulse lines, a fuel cut-off means connected with the stopping device and adapted to cut off the fuel supply of the respective unit in response to a single signalling impulse from the said common stopping signalling impulse line, compressed air restarting means connected with the respective starting device and adapted to admit compressed air operatively from the said common supply source in response to a single signalling impulse from the said common starting signalling impulse line, and control means each having a "running" position and a "rest" position in accordance with the condition of the respective unit and adapted to connect selectively the starting and stopping devices of a particular unit with the said common signaling impulse lines in dependence on the "running" or "rest" position of the said particular unit and of the units next to it in a predetermined cyclic order.

5. Power plant as claimed in claim 4 in which the individual internal combustion compressor units include a hydraulic cylinder adapted to be connected with the common source of fluid pressure, a hydraulic piston adapted to operate in said hydraulic cylinder and to move the free pistons apart to a starting position while the internal combustion compressor is at rest, and means for supplying compressed air to a cylinder of the compressor unit in response to a single signalling impulse received by the respective starting device from the common starting signalling impulse line.

6. Power plant as claimed in claim 4 in which the compressed air restarting means of each internal combustion compressor unit are adapted for imparting variable starting energy to a free piston of said unit and include, in the connection of the said compressed air starting means with the said common source of compressed air supply, a master starting valve, means responsive to signalling impulses operatively connected with the said valve and with the control means and adapted to move the said valve into its open position in response to a signalling impulse received from the starting signalling impulse line through the said control means, a timing cut-off valve adapted to be in an open position when the respective internal combustion compressor unit is at rest and including means adapted to be tripped by the motion of said unit to allow the air pressure to close the said timing valve and thereby to keep the tripping means out of the way of further actuation by the said unit while the latter continues to run, and means for resetting the said timing valve when the pressure is cut off by reclosure of the said master starting valve.

7. Power plant comprising in combination a plurality of internal-combustion compressor devices, a fluid-pressure-operated starting device and stopping device for each, a starting signalling impulse pipe, a stopping signalling impulse pipe, valve means for connecting fluid pressure temporarily to either of these pipes, a pair of pipe connections for each said compressor, one pipe of this pair going from said stopping signalling impulse pipe to the stopping device and the other from said starting signalling impulse pipe to the starting device of the associated compressor, a piston valve in each said pair of pipe connections having a first position blocking the fluid path to the starting device of said associated compressor and a second position blocking the fluid path to the stopping device of the next preceding compressor in cyclic order, a spring biasing said piston valve to its first position, means for applying fluid pressure to each said piston valve in opposition to said spring, valve means for cutting off said fluid pressure in response to the running of the said associated compressor device, a throw-over valve in said pair of pipe connections having a position in which it establishes the fluid path to the stopping device of the said associated compressor irrespective of the position of said spring-biased piston valve, means for moving said throw-over valve away from said position in response to the starting of said associated compressor and means for moving it to said position in response to the starting of said preceding compressor.

ROBERT JAMES WELSH.

REFERENCES CITED

The following references are of record in the file of this patent:

UNITED STATES PATENTS

| Number | Name | Date |
|---|---|---|
| 1,629,927 | Pescara | May 24, 1927 |
| 1,666,630 | Pescara | Apr. 17, 1928 |
| 1,757,215 | Pescara | May 6, 1930 |
| 2,038,442 | Pescara | Apr. 21, 1936 |
| 2,077,802 | Martin | Apr. 20, 1937 |
| 2,102,121 | Janicke | Dec. 14, 1937 |
| 2,147,935 | Steiner | Feb. 21, 1939 |
| 2,090,709 | Steiner | Aug. 24, 1937 |
| 2,200,892 | Pescara | May 14, 1940 |
| 2,260,252 | John et al. | Oct. 21, 1941 |
| 2,306,978 | Pescara | Dec. 29, 1942 |

FOREIGN PATENTS

| Number | Country | Date |
|---|---|---|
| 183,758 | Switzerland | July 16, 1936 |
| 668,830 | France | July 22, 1929 |